R. L. DORSEY.
TRUCK.
APPLICATION FILED APR. 27, 1916.
1,209,408.
Patented Dec. 19, 1916.
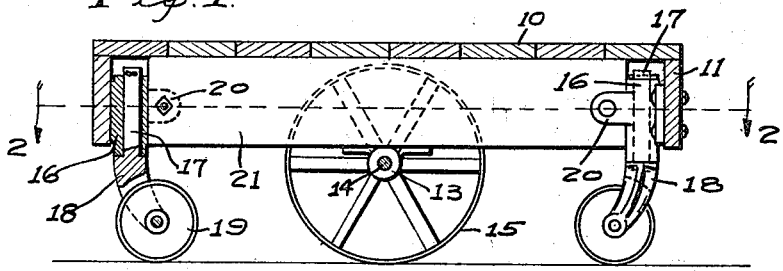
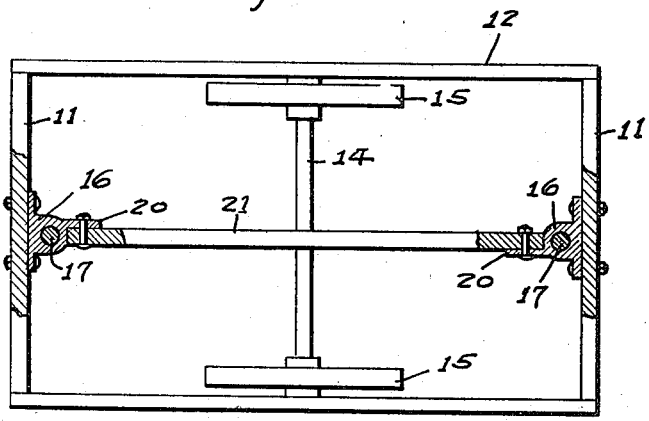
WITNESSES:
INVENTOR
Robert L. Dorsey
BY
Lockwood & Lockwood
ATTORNEYS

UNITED STATES PATENT OFFICE.

ROBERT L. DORSEY, OF INDIANAPOLIS, INDIANA, ASSIGNOR TO TUCKER & DORSEY MANUFACTURING COMPANY, OF INDIANAPOLIS, INDIANA, A CORPORATION.

TRUCK.

1,209,408.

Specification of Letters Patent.

Patented Dec. 19, 1916.

Application filed April 27, 1916. Serial No. 94,003.

*To all whom it may concern:*

Be it known that I, ROBERT L. DORSEY, a citizen of the United States, and a resident of Indianapolis, county of Marion, and State of Indiana, have invented a certain new and useful Truck; and I do hereby declare that the following is a full, clear, and exact description thereof, reference being had to the accompanying drawings, in which like letters refer to like parts.

The object of this invention is to provide a truck which will be more sturdy and durable than the ordinary trucks now in use, so as to strengthen the swivel rollers on each end thereof.

Heretofore, in using trucks of the ordinary construction under heavy load, the swivel rollers engaging obstacles become loosened and finally give away.

This invention provides a brace which prevents the rollers from being loosened or forced out of their position under any strain.

The invention hereafter described ties the swivels securely in place, absorbs the shock, supports the platform and by preventing any vibration, deadens the noise. This is accomplished by means of the center support or brace which extends longitudinally of the truck so that its ends engage the swivels and wedge or brace them against each end of the truck and holds them perfectly rigid and pressed against each other.

The full nature of the invention will be understood from the accompanying drawings and the following description and claims.

In the drawings, Figure 1 is a longitudinal cross section through the truck showing the center brace in position. Fig. 2 is a cross section on the line 2—2 of Fig. 1.

In the drawings there is shown a truck having a platform 10 with end supports 11 secured thereto and side supports 12. Secured to the side supports there is a bearing 13 which supports an axle 14 having center wheels 15 thereon.

Securely bolted to the end supports 11 there are swivel bearings 16 in which a swivel pin 17 extends, said swivel pin having a shoulder upon which the bearing rides and a fork 18 on its lower end having a swivel roller 19 therein. The swivel bearings and rollers, as heretofore stated, are secured at each end of the truck so as to readily turn in any direction depending on the movement thereof.

Integral with and extending inwardly from said swivel bearings 16 there are extensions 20. Securely bolted to said extensions there is a center brace 21 which extends centrally and longitudinally of the truck just below the platform so that the platform may be braced thereby. The ends of the said center brace are adapted to engage the swivel bearings 17 and wedge or securely hold them against the end braces 11 so that the swivel bearings will have no play and in the event of their being snagged upon any obstacle in the course of their use instead of being loosened or torn from the end braces they will be engaged and held securely in place by the center brace. Also by this means they may be prevented from vibrating and thereby causing a rattle, so as to eliminate any noise caused thereby.

The invention claimed is:

1. A truck having depending end braces, a platform thereon, bearings secured to said braces, rollers on said bearings, and a longitudinal center brace adjacent the underside of the platform and extending between said bearings and adapted to engage and wedge said bearings securely against said end braces and support said platform.

2. A truck having end braces thereon, bearings secured to said end braces, rollers on said bearings, a center brace adapted to engage said bearings and wedge them securely against said end braces, and an extension on said bearings to which said center brace is firmly secured.

In witness whereof, I have hereunto affixed my signature.

ROBERT L. DORSEY.

Copies of this patent may be obtained for five cents each, by addressing the "Commissioner of Patents, Washington, D. C."